(12) United States Patent
Kikuchi et al.

(10) Patent No.: US 8,107,778 B2
(45) Date of Patent: Jan. 31, 2012

(54) WAVEGUIDE ELEMENT AND METHOD OF PRODUCTION THEREOF

(75) Inventors: Takashi Kikuchi, Kanagawa (JP); Roshan Thapliya, Kanagawa (JP); Shigetoshi Nakamura, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 367 days.

(21) Appl. No.: 12/558,962

(22) Filed: Sep. 14, 2009

(65) Prior Publication Data
US 2010/0226605 A1 Sep. 9, 2010

(30) Foreign Application Priority Data
Mar. 9, 2009 (JP) .................................. 2009-055659

(51) Int. Cl.
G02B 6/12 (2006.01)
G02B 6/26 (2006.01)

(52) U.S. Cl. ................. 385/14; 385/40; 385/50
(58) Field of Classification Search ............. 385/40, 385/41, 50; 264/1.27
See application file for complete search history.

(56) References Cited

U.S. PATENT DOCUMENTS

| | | | | |
|---|---|---|---|---|
| 5,131,060 A * | 7/1992 | Sakata | ............................ | 385/2 |
| 6,643,419 B2 * | 11/2003 | Chang et al. | .................... | 385/14 |
| 6,847,751 B2 * | 1/2005 | Chang et al. | .................... | 385/16 |
| 7,095,938 B2 * | 8/2006 | Tolstikhin | ...................... | 385/131 |
| 7,343,061 B2 * | 3/2008 | Forrest et al. | ................... | 385/14 |

FOREIGN PATENT DOCUMENTS

| JP | A-4-346322 | 12/1992 |
|---|---|---|
| JP | A-6-75255 | 3/1994 |
| JP | A-6-214275 | 8/1994 |
| JP | A-9-105965 | 4/1997 |
| JP | A-11-231002 | 8/1999 |
| JP | A-2002-53667 | 2/2002 |

OTHER PUBLICATIONS

Japanese Office Action dated Nov. 30, 2010 in Japanese Patent Application No. 2009-055659 (with translation).

* cited by examiner

*Primary Examiner* — Omar Rojas
(74) *Attorney, Agent, or Firm* — Oliff & Berridge, PLC

(57) ABSTRACT

There is provided a method of producing a waveguide element comprising steps of forming a lower cladding layer having a refractive index n1 on a substrate having a lower electrode; forming an active core layer having a refractive index n2 and exhibiting an electro-optical effect on a surface of the lower cladding layer; forming a protective layer having a reflective index n4 on a surface of the active core layer; forming a passive core layer having a reflective index n3 on a surface of the protective layer; exposing the passive core layer with a predetermined pattern to form an optical circuit; forming an upper cladding layer on a surface of the passive core layer; forming an upper electrode on a surface of the upper cladding layer; and performing a polarization orientation treatment in which the active core layer is softened or liquidized and cured while the electric field is applied.

5 Claims, 3 Drawing Sheets

WAVEGUIDE ELEMENT AND METHOD OF PRODUCTION THEREOF

CROSS-REFERENCE TO RELATED APPLICATION

This application claims priority under 35 USC 119 from Japanese Patent Application No. 2009-055659 filed on Mar. 9, 2009.

BACKGROUND

Technical Field

The present invention relates to a waveguide element and a method of production thereof.

SUMMARY

According to an aspect of the invention, there is provided a method of producing a waveguide element including forming a lower cladding layer having a refractive index n1 on a substrate on which surface or side surface a lower electrode is formed; forming an active core layer on a surface of the lower cladding layer, the active core layer having a refractive index n2 that is larger than the refractive index n1 of the lower cladding layer, the active core layer exhibiting an electro-optical effect; forming a protective layer on a surface of the active core layer, the protective layer having a refractive index n4 that is smaller than the refractive index n2 of the active core layer and larger than the refractive index n1 of the lower cladding layer; forming a passive core layer on a surface of the protective layer, a refractive index of the passive core layer being changed by exposure to light, the passive core layer having a refractive index n3 after the exposures the refractive index n3 being smaller than the refractive index n4 of the protective layer and larger than the refractive index n1 of the lower cladding layer; exposing the passive core layer with a predetermined pattern to form an optical circuit having a refractive index n3, the optical circuit introducing light to the active core layer or guiding out the light passing through the active core layer; forming an upper cladding layer on a surface of the passive core layer in which the optical circuit is formed, the upper cladding layer having a refractive index n5 that is smaller than the refractive index n3 of the passive core layer after the exposure thereof; forming an upper electrode on a surface of the upper cladding layer, the upper electrode being used to apply an electric field to the active core layer; and performing a polarization orientation treatment after the upper electrode is formed, in which the active core layer is put into a softened or liquid state and cured while the electric field is applied.

BRIEF DESCRIPTION OF THE DRAWINGS

Exemplary embodiments of the present invention will be described in detail based on the following figures, wherein.

DETAILED DESCRIPTION

First Exemplary Embodiment

Figure 1A:
FIGS. 1A to 1D are flow diagrams illustrating an initial stage in a procedure of the method of producing a waveguide element according to a first exemplary embodiment of the invention.
Figure 1B:
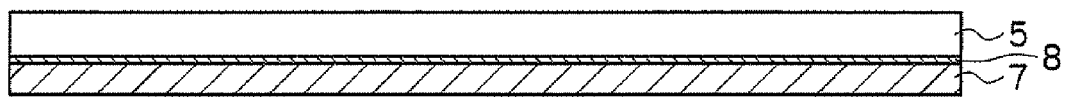
Figure 1C:
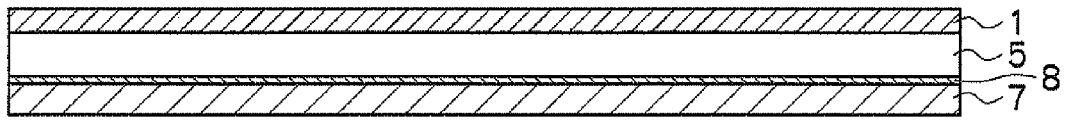
Figure 1D:
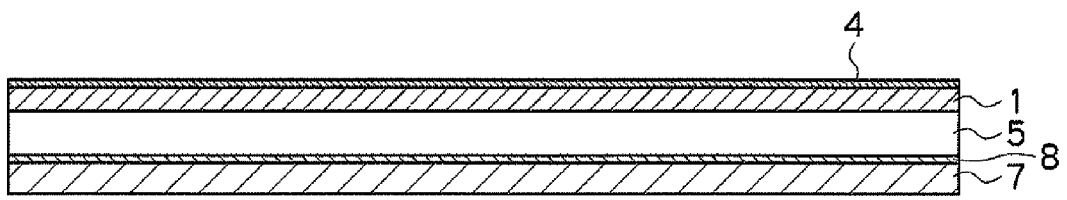

A method of producing a waveguide element according to a first exemplary embodiment of the present invention will be described below.

As illustrated in FIGS. 1A to 1D, FIGS. 2A to 2C, and FIGS. 3A and 3B, the method of producing a waveguide element of the first exemplary embodiment includes:

a) a process (Process 1 in FIG. 1A) in which a lower electrode 8 is formed on a surface of a substrate 7;

b) a process (Process 2 in FIG. 1B) in which a lower cladding layer 5 having a refractive index n1 is formed on the lower electrode 8;

c) a process (Process 3 in FIG. 1C) in which an active core layer 1 having a refractive index n2 and exhibiting an electro-optical effect is formed on the surface of the lower cladding layer 5;

d) a process (Process 4 in FIG. 1D) in which a protective layer 4 having a refractive index n4 is formed on the surface of the active core layer 1;

e) a process (Process 5 in FIG. 2A) in which a passive core layer 3 is formed on the surface of the protective layer 4, a refractive index of the passive core layer 3 being changed by exposure, the passive core layer 3 having a refractive index n3 higher than that of portions surrounding the passive core layer 3 after the exposure;

f) a process (Process 6 in FIGS. 2B and 2C) in which the passive core layer 3 is exposed using a predetermined pattern to form an optical circuit 2;

g) a process (process 7 in FIG. 3A) in which an upper cladding layer 6 having the refractive index n1 is formed on the surface of the passive core layer 3 in which the optical circuit 2 is formed; and h) a process (Process 8 in FIG. 3B) in which an upper electrode 9 is formed on the surface of the upper cladding layer 6.

A polarization orientation treatment is performed on the waveguide element prepared by the above-described method of producing a waveguide element to polarize the active core layer 1 (Process 9). In the polarization orientation treatment, the whole of the waveguide element is heated to put the active core layer 1 in a softened state, or a state in which it flows, and the waveguide element then is cured while applying an electric field thereto.

The following relationship holds among the refractive index n1 of the lower cladding layer 5 and upper cladding layer 6, the refractive index n3 of the optical circuit 2, the refractive index n2 of the active core layer 1, and the refractive index n4 of the protective layer 4:

$$n1 < n3 < n4 < n2$$

Preferably the following relationship holds among the refractive index n4 of the protective layer 4, the refractive index n3 of the optical circuit 2, and the refractive index n2 of the active core layer 1:

$$n2 - n4 = 0.00 \text{ to } 0.03$$

$$n4 - n3 = 0.00 \text{ to } 0.03$$

Each process will be described in detail.

(1) Process 1

Although there is no particular limitation to the substrate 7 used in Process 1, preferably a substrate having excellent flatness is used. Specifically, a metal substrate, a silicon substrate, or a transparent substrate may be used, and appropriately selected according to the configuration of the waveguide element to be prepared. When a metal substrate is used as the substrate 7, because the substrate has a conductive property, the lower electrode 8 can be omitted.

For example, preferably a gold, silver, copper, or aluminum substrate is used as the metal substrate. Examples of transparent substrates include quartz, glass, and transparent synthetic resin substrates. When a transparent substrate is used as the substrate 7, the substrate 7 may act as the lower cladding layer 5.

In Process 1, when an electrically insulating substrate such as the transparent substrate is used as the substrate 7, the lower electrode 8 is formed on the substrate 7. In the first exemplary embodiment 1, the lower electrode 8 is formed on the surface of the substrate 7, but the lower electrode 8 may be formed on a side surface of the substrate 7. The lower electrode 8 may be grounded, or may be connected to electric wiring piercing the substrate 7, or may be connected to electric wiring of the backside of the substrate 7 by electric wiring provided in the side face of the substrate 7.

The lower electrode 8 may be a metallized electrode that is formed by evaporating metal, or may be a transparent substrate made of indium tin oxide or zirconium tin oxide. For example, gold, silver, copper, or aluminum may be used as the metal used in the metallized electrode.

(2) Process 2

In Process 2, when the lower electrode 8 is formed on the surface of the substrate 7, there is no limitation to the material used in the lower cladding layer 5 formed on the surface of the lower electrode 8 as long as the material of the lower cladding layer 5 has a refractive index lower than that of the material used in the passive core layer 3 or the active core layer 1. Specifically, polymers such as polyimide resin, fluorinated polyimide resin, light curing acrylic resin, and epoxy resin are preferably used to form the lower cladding layer 5.

Various methods such as a spin coating method, a dip coating method, a spray coating method, and a print coating method can be adopted as a method of applying the polymer. Particularly, a spin coating method is preferably adopted from the viewpoint of convenience.

(3) Process 3

As the material of the active core layer 1 formed in Process 3A, a low-molecular compound exhibiting an electro-optical effect, in which the reflective index of the compound changes in accordance with the intensity of an electric field, dispersed in a polymer that forms a binder, or a polymer exhibiting an electro-optical effect, can be used.

Examples of the polymer that forms a binder include poly (metha)acrylate resin, polyimide resin, polyetherimide resin, polycarbonate resin, polyethylene terephthalate resin, polysulfone resin, polyethersulfone resin, polyphenylsulfone resin, polyurethane resin, polyamide resin and the like. Of these polymers, polyimide resin, polyetherimide resin, polycarbonate resin, and polysulfone resin are preferably used because they exhibit a good balance between solubility and resistance to a solvent. From the viewpoint of long-term reliability of the prepared waveguide element, the polymer preferably has a glass transition temperature of 200° C. or higher.

Examples of the low-molecular compound included the polymer include an azo dye having an electron-donating group and an electron-accepting group, and a merocyanine dye. Specifically, preferable examples include Disperse Red 1 (DR1), 2-methyl-6-(4-N,N-dimethylaminobenzylidene)-4H-pyrane-4-ylidenepropanyl, 4-{[4-(dimethylamino) phenyl]imino}-2,5-cyclohexadiene-1-on and the like.

An example of the polymer having the electro-optical effect includes poly-[(methyl methacrylate)-Co-(DR1 acrylate)] (manufactured by Aldrich).

The above-described material is dissolved in an organic solvent or melted, and then applied to the surface of the lower cladding layer 5 with a predetermined thickness, and then the material is dried or cured, thereby forming the active core layer 1. As with the lower cladding layer, various methods can be adopted as the method of application, such as the spin coating method, the dip coating method, the spray coating method, or the print coating method. Particularly, the spin coating method is preferably adopted from the viewpoint of convenience.

(4) Process 4

The protective layer formed in Process 4 preferably has a volume resistivity of $10^8$ to $10^{13}$ Ω·cm. A water-soluble polymer, an alcohol-soluble polymer, or a glass material are preferably used as the protective layer.

Examples of the water-soluble polymer include polyvinyl alcohol, polyvinyl pyrrolidone, polymethacrylate, and water-soluble phenol resins. Examples of the alcohol-soluble polymer include alcohol-soluble polyurethane resin, N-methyl-methoxylated nylon, alcohol-soluble rosin resin, and alcohol-soluble phenol resin.

The water-soluble polymer and the alcohol-soluble polymer can be applied as an aqueous solution or an alcohol solution. In order to provide the protective layer with a volume resistivity of $10^8$ to $10^{13}$ Ω·cm, salts such as sodium chloride and tetrabutylammonium chloride may be added to the aqueous solution or the alcohol solution.

When the glass material is used as the protective layer, the protective layer may be formed by a sol-gel method. In such cases, the refractive index may be adjusted by adding a metal such as titanium and/or zirconium to the gel. However, quartz is undesirable as the material of the protective layer because of the excessively high volume resistivity thereof.

(5) Process 5

As a material that forms the passive core layer 3 formed in Process 5, a polymer which forms a binder, to which is added a reactant that has optical reactivity, in other words, that changes its refractive index when exposed to light, may be used.

The materials similar to those cited in Process 3 may be used as the polymer that forms the binder.

The reactant may contain a single compound or a combination of plural compounds. The single compound may be DNQ (DiazoNaphthoQuinone). Examples of the combination of plural compounds include a combination of acrylic acid ester and an α-hydroxyketone derivative, and a combination of an epoxide compound and aromatic sulfonic acid.

The passive core layer 3 can be formed by applying over the protective layer 4 a solvent solution of the binder polymer into which the reactant is incorporated, or a melted binder polymer into which the reactant is incorporated, and then drying or curing the solution or melted polymer. The same method of application as that in Process 2 and Process 3 may be used.

(6) Process 6

As described above, in Process 6, the passive core layer 3 formed in Process 5 is exposed to form the optical circuit 2. Examples of the optical circuit 2 that can be formed in Process 6 include a multimode interference waveguide element and a branched interference modulator such as a Mach-Zehnder modulator.

Figure 2A:
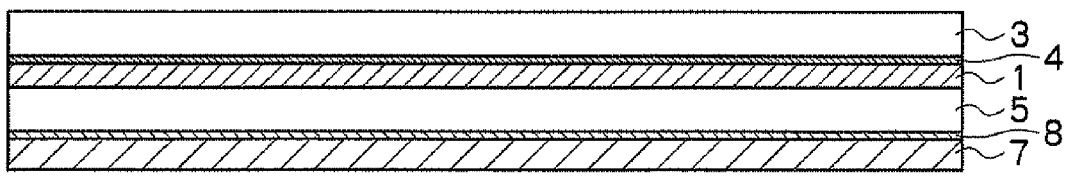
FIGS. 2A to 2C are flow diagrams illustrating an intermediate stage in the procedure of the method of producing a waveguide element method of production of the first exemplary embodiment.
Figure 2B:
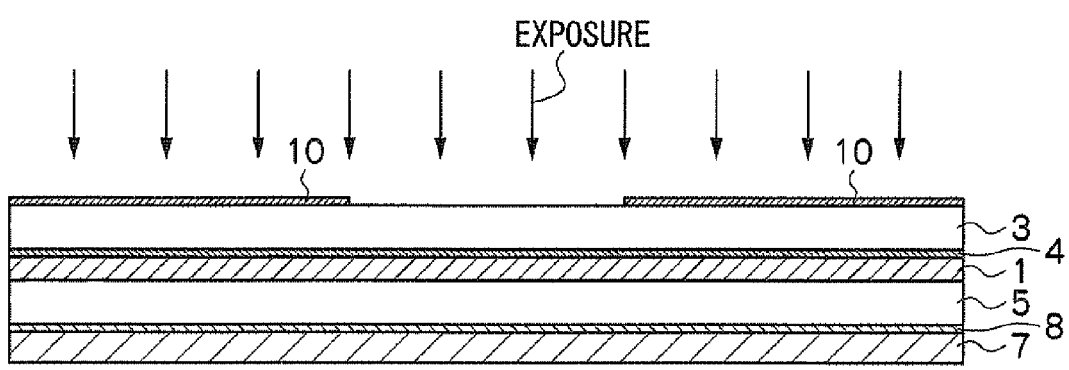
Figure 2C:
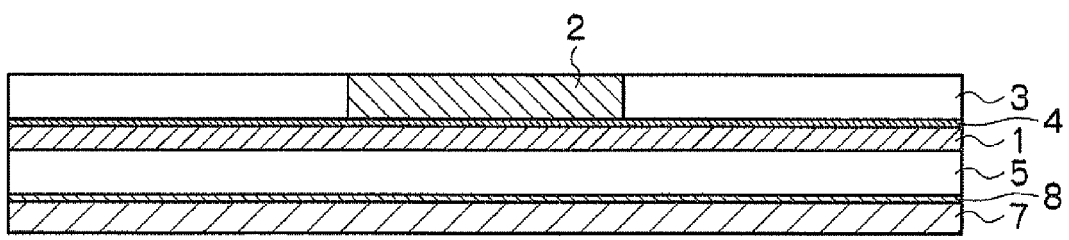

In the method of exposing the passive core layer 3, as illustrated in FIG. 2B, the passive core layer 3 is covered with a mask 10 on which a predetermined pattern is printed, and the exposure is performed by a stepper or an aligner such that only a point where the optical circuit 2 is to be formed is irradiated with light. Alternatively, the drawing may be directly performed with a laser beam.

When a combination of a acrylic acid ester with a low boiling point and an α-hydroxyketone is employed as the reactant, a heating treatment may be performed to remove unreacted acrylic acid ester after the exposure, thereby dramatically improving the reliability and stability of the optical circuit 1 formed in the passive core layer 3.

In the first exemplary embodiment, the optical circuit 2 is formed after the active core layer 1, the protective layer 4, and the passive core layer 3 are formed in this order from the bottom. Alternatively, the protective layer 4 and the active core layer 1 may be formed after the passive core layer 3 is formed to form the optical circuit 2.

(7) Process 7

In Process 7, when the upper cladding layer 6 is formed on the surface of the passive core layer 3, there is no limitation to the material of the upper cladding layer 6 as long as the material of the upper cladding layer 6 has a refractive index lower than that of the material used in the passive core layer 3 or active core layer 1. Specifically the polymer used to form the lower cladding layer 5 is preferably used to form the upper cladding layer 6. The method of application is similar to that described in Process 2.

(8) Process 8

Figure 3A:
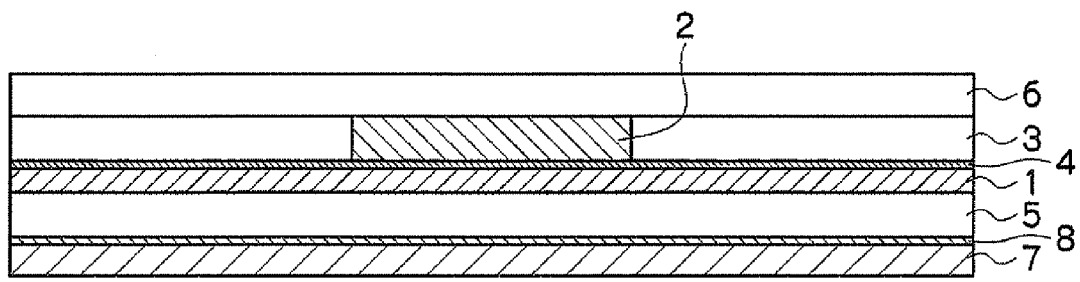
FIGS. 3A to 3B are flow diagrams illustrating a final stage in the procedure of the method of producing waveguide element method of production of the first exemplary embodiment.
Figure 3B:
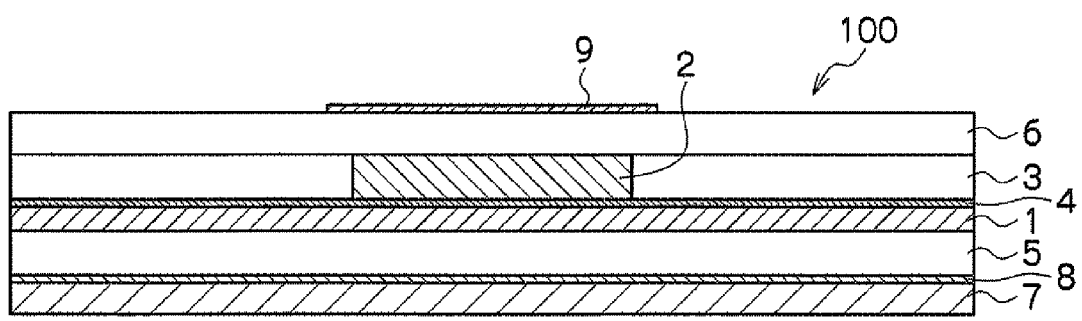

In Process 8, the upper electrode 9 is formed on all or the part of the surface of the upper cladding layer 6 as illustrated in FIG. 3B. The material and method for forming the upper electrode 9 are similar to those for forming the lower electrode 8.

(9) Process 9

In Process 9, the polarization orientation treatment is performed in order to impart the electro-optical effect to the active core layer 1.

The polarization orientation treatment can be performed as follows: a layered body prepared by Process 1 to Process 9 is heated to a temperature at which the active core layer 1 becomes soft or liquid, and then the whole layered body is solidified by cooling while applying an electric field to the layered body in the thickness direction thereof. As a method of applying an electric field to the layered body, performing corona discharge, or applying direct current voltage to the layered body in the thickness direction thereof by grounding the lower electrode 8 and connecting the upper electrode 9 to a direct-current power supply, may be used.

Finally the layered body is diced or cleaved to cut out the desired waveguide element.

EXAMPLES

1. Example 1

The silicon substrate is used as the substrate 7, and gold sputtering is performed with respect to the silicon substrate to form the lower electrode 8.

Then, an ultraviolet curing resin having a refractive index n1 of 1.50 is applied to the surface of the lower electrode 8, and the ultraviolet curing resin is irradiated with ultraviolet rays to cure the ultraviolet curing resin, thereby forming the lower cladding layer 5.

A polymer solution having a refractive index n2 of 1.64 is applied onto the lower cladding layer 5, and heated and cured to form the active core layer 1. Then a polyvinyl alcohol aqueous solution is applied onto the active core layer 1, and heated and dried to form the protective layer 4.

Then a polymer solution having a refractive index of 1.53 is applied onto the protective layer 4, and baked at 70° C. to remove the solvent, thereby forming the passive core layer 3. The surface of the passive core layer 3 is exposed with the aligner to pattern a channel including a Mach-Zehnder modulator, and the channel is baked at 150° C. to form the optical circuit 2.

The upper cladding layer 6 is formed by following a procedure similar to that of the lower cladding layer 5, and the upper electrode 9 is formed through a liftoff process. The polarization orientation treatment is performed with respect to the obtained layered body by the corona discharge to prepare the waveguide element 100.

Light having a wavelength of 1550 nm is introduced to the obtained waveguide element and light transmission is confirmed. A response is checked by grounding the lower electrode 8 and applying a voltage to the upper electrode 9 and light modulation is confirmed.

The polymer solution having a refractive index of 1.53 which is used to form the passive core layer 3 is a solution in which polycarbonate resin, butyl methacrylate, Irgacure 184 are dissolved in tetrahydrofuran. The polymer solution having the refractive index n2 of 1.64 which is used to form the active core layer 1 is a solution in which polysulfone resin and DR1 are dissolved in cyclohexanone.

2. Comparative Example 1

The formation of the lower electrode 8 on the substrate 7, the formation of the lower cladding layer 5, and the formation of the active core layer 1 are performed in a manner similar to that of the first exemplary embodiment. After the active core layer 1 is formed, the passive core layer 3 is formed, a resist is applied to the surface of the passive core layer 3, and exposure is performed with the aligner to pattern the channel including the Mach-Zehnder modulator, each of the above being performed in a manner similar to that of Example 1, except that the etching is performed by reactive ion etching (RIE) to form the optical circuit 2.

Upon observing the obtained waveguide element, a point at which the etching is performed with respect to the active core layer 1, and a point at which the etching is stopped within the passive core layer 3 are each observed, and it is determined that the section is not formed according to design.

3. Comparative Example 2

After the active core layer 1 is formed, when the polymer solution having the refractive index of 1.64, which forms the passive core layer 3, is applied without forming the protective layer 4, the active core layer 1 is dissolved, and the resultant layered body could not be used as a waveguide element.

The foregoing description of the exemplary embodiments of the present invention has been provided for the purpose of illustration and description. It is not intended to be exhaustive or to limit the invention to the precise forms disclosed. Obviously, many modification and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A method of producing a waveguide element comprising:
    forming a lower cladding layer having a refractive index n1 on a substrate on which surface or side surface a lower electrode is formed;
    forming an active core layer on a surface of the lower cladding layer, the active core layer having a refractive index n2 that is larger than the refractive index n1 of the lower cladding layer, the active core layer exhibiting an electro-optical effect;
    forming a protective layer on a surface of the active core layer, the protective layer having a refractive index n4 that is smaller than the refractive index n2 of the active core layer and larger than the refractive index n1 of the lower cladding layer;
    forming a passive core layer on a surface of the protective layer, a refractive index of the passive core layer being changed by exposure to light, the passive core layer having a refractive index n3 after the exposure, the refractive index n3 being smaller than the refractive index n4 of the protective layer and larger than the refractive index n1 of the lower cladding layer;
    exposing the passive core layer with a predetermined pattern to form an optical circuit having a refractive index n3, the optical circuit introducing light to the active core layer or guiding out the light passing through the active core layer;
    forming an upper cladding layer on a surface of the passive core layer in which the optical circuit is formed, the upper cladding layer having a refractive index n5 that is smaller than the refractive index n3 of the passive core layer after the exposure thereof;
    forming an upper electrode on a surface of the upper cladding layer, the upper electrode being used to apply an electric field to the active core layer; and
    performing a polarization orientation treatment after the upper electrode is formed, in which the active core layer is put into a softened or liquid state and cured while the electric field is applied.

2. The method of claim 1, wherein an optical material having the refractive index n1 that is identical to that of the lower cladding layer is used as the upper cladding layer.

3. The method of claim 1, wherein one of a water-soluble polymer, an alcohol-soluble polymer, and a glass material is used as the protective layer.

4. The method of claim 2, wherein one of a water-soluble polymer, an alcohol-soluble polymer, and a glass material is used as the protective layer.

5. A waveguide element comprising:
    a substrate;
    a lower electrode that is formed on a surface or on a side surface of the substrate;
    a lower cladding layer that is formed on the substrate, the lower cladding layer having a refractive index n1;
    an active core layer that is formed on a surface of the lower cladding layer, the active core layer having a refractive index n2 that is larger than the refractive index n1 of the lower cladding layer, the active core layer exhibiting an electro-optical effect;
    a protective layer that is formed on a surface of the active core layer, the protective layer having a refractive index n4 that is smaller than the refractive index n2 of the active core layer and larger than the refractive index n1 of the lower cladding layer;
    a passive core layer that is formed on a surface of the protective layer, the passive core layer having a refractive index n3 that is smaller than the refractive index n4 of the protective layer and larger than the refractive index n1 of the lower cladding layer, exposure being performed with respect to the passive core layer in a predetermined pattern to form an optical circuit, the optical circuit introducing light to the active core layer or guiding out the light passing through the active core layer;
    an upper cladding layer that is formed on a surface of the passive core layer in which the optical circuit is formed, the upper cladding layer having a refractive index n5 that is smaller than the refractive index n3 of the passive core layer after the exposure; and
    an upper electrode that is used to apply an electric field to the active core layer formed on the surface of the upper cladding layer.

* * * * *